United States Patent [19]

Bender

[11] 4,065,833

[45] Jan. 3, 1978

[54] REMOVABLE TOGGLE LINK

[76] Inventor: Lawrence C. Bender, 2125 N. 88th St., Kansas City, Kans. 66109

[21] Appl. No.: 702,700

[22] Filed: July 6, 1976

[51] Int. Cl.² ............................................. A44G 13/00
[52] U.S. Cl. .................................. 24/201 A; 24/72.7; 24/242
[58] Field of Search ....... 24/201 A, 265 CD, 230 AS, 24/72.7, 242, 212, 265 R; 248/339; 105/473, 465, 475, 466, 478, 485, 481; 294/97

[56] References Cited

U.S. PATENT DOCUMENTS

| 288,467 | 11/1883 | McGuiggan | 294/97 |
|---|---|---|---|
| 720,843 | 2/1903 | Peters | 24/242 |
| 726,636 | 4/1903 | Carel | 248/58 |
| 943,220 | 12/1909 | Dufour | 24/242 |
| 3,295,157 | 1/1967 | Gluth | 24/242 |
| 3,422,508 | 1/1969 | Higuchi | 24/201 A |

FOREIGN PATENT DOCUMENTS

| 513,244 | 12/1929 | Germany | 24/201 A |
|---|---|---|---|
| 4,231 of | 1898 | United Kingdom | 24/230 AS |
| 4,373 of | 1903 | United Kingdom | 24/242 |

Primary Examiner—Bernard A. Gelak
Attorney, Agent, or Firm—Lowe, Kokjer, Kircher, Wharton & Bowman

[57] ABSTRACT

A removable link formed of two identical hook members each having integral base, shank and bight portions and being pivotally pinned in reverse confronting engagement at the junctures of the shank and base portions. In a closed position, the bases thus extend in opposite directions while the bight portions overlie each other to form a continuous, teardrop loop.

4 Claims, 5 Drawing Figures

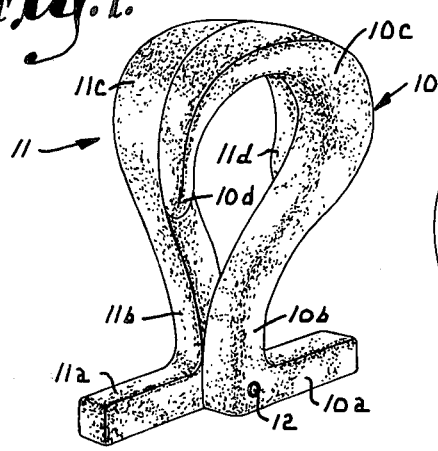
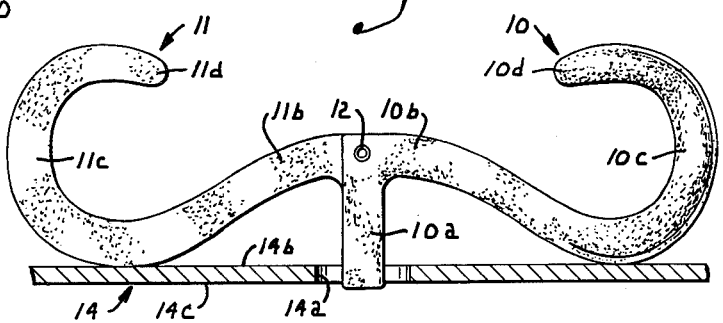
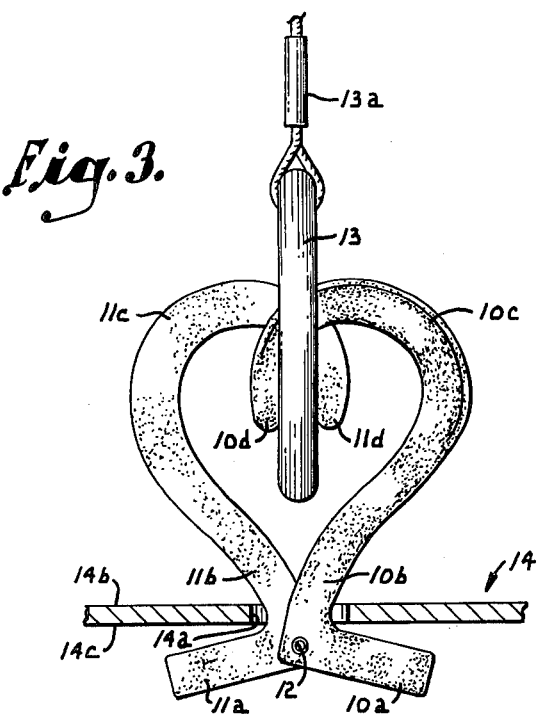
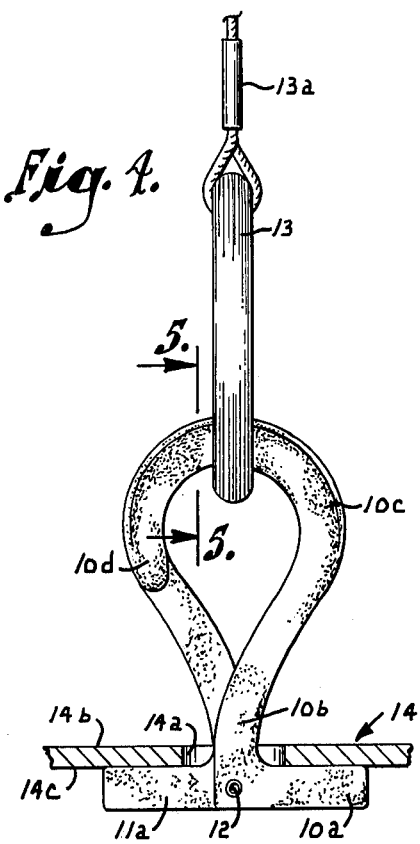
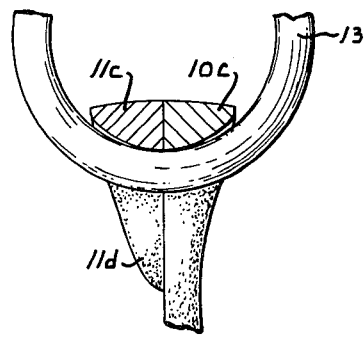

4,065,833

REMOVABLE TOGGLE LINK

BACKGROUND AND SUMMARY OF THE INVENTION

This invention relates to a removable shackle or link. More particularly, the invention relates to a link removably insertable in an apertured member for the purpose of securing a chain, rope, cable or the like.

There are numerous applications requiring a loop or hook to which is secured a chain or similar flexible tie. One such example is exemplified in the hauling of automobiles on a transport trailer. It is necessary to secure the automobiles to the trailer by means of tie-down chains. Numerous devices are presently in use which are typically welded to the framework of the trailer in order to secure the chains. The location of such devices on the trailer naturally depends upon the dimensions of the vehicle to be secured. If the tie-down devices are arranged to secure a vehicle of a particular size, and it is then necessary to secure a different sized vehicle, the tie-down devices must be re-located. This commonly involves cutting the device from the trailer frame and re-welding it at a new location. The expense of time and labor are substantial drawbacks to this method.

Consequently, there is a need for a removable link or shackle which can be readily positioned at various locations on the trailer frame. The primary object of this invention is to meet this need.

More specifically, an object of the invention is to provide a link for securing a chain or flexible tie-down and which may be removably inserted in an apertured member.

Another object of the invention is to provide a removable link insertable in an opening of a plate member having a blind or inaccessible back side. Thus, coupling of the link may be performed entirely on the accessible surface of the apertured retaining member.

Yet another object of the invention is to provide a removable link insertable in an apertured member and which comprises a complete assemblage which may be readily removed without removing any separate parts from the link. In other words, both installation and removal of the link may be accomplished by simple pivotal scissoring action of the link without resort to separate pins, bolts or nuts which could become lost during use.

An additional object of the invention is to provide a link of the character described which may be safely employed to secure a chain or rope and which may be removed from the apertured part only by affirmative action by the user.

Still another object of the invention is to provide a removable link which provides a coupling or forms part of a tackle adapted to distribute a tension force laterally to the plane of the apertured member to which the link is removably secured.

A further object of the invention is to provide a link of the character described which is rugged and durable in construction, but at the same time represents an economical and easily manufactured coupling.

Other and further objects of the invention, together with the features of novelty appurtenant thereto, will appear in the course of the following description.

DESCRIPTION OF THE DRAWING

In the accompanying drawing, which forms a part of the specification and is to be read in conjunction therewith, and in which like reference numerals are employed to indicate like parts in the various views:

FIG. 1 is a perspective view of a removable link constructed in accordance with a preferred embodiment of the invention;

FIG. 2 is a side elevational view of the link shown in an open position to be inserted through an aperture of a plate member;

FIG. 3 is a side elevational view of the link shown in a partially closed position to encircle a connecting ring of a flexible tie-down;

FIG. 4 is a side elevational view of the link in the fully closed position; and

FIG. 5 is an enlarged fragmentary view taken along line 5—5 of FIG. 4 in the direction of the arrows.

Referring to the drawing in more detail, the link basically comprises a bifurcated closed loop formed by first and second hook members 10 and 11. The first hook member 10 includes a base or toggle 10a which is integrally joined approximately at a right angle at the inner end thereof by a shank 10b. The shank 10b, in turn, is integrally joined with a bight or hook portion 10c which extends upwardly from the shank and presents a uniform curve to the end 10d of the hook portion. The end 10d terminates short of the shank 10b or hook portion 10c in order to provide an opening to the bight of the hook portion 10c. Thus, the hook member 10 is generally in the shape of the numeral "2". The back surface of the "2" is flat and lies in a common plane, while the front and side surfaces are contoured in relief from the back surface as illustrated. In section (FIG. 5), the hook portion 10c is substantially quarter-round.

The second hook member 11 is identical in configuration to the first hook member 10 and includes a toggle 11a integrally joined approximately at right angles at the inner end thereof by a shank 11b. The shank 11b, in turn, integrally flows into the bight or hook portion 11c which extends upwardly from the shank 11b in a uniform curve to the terminal end 11d.

With the flat surfaces (i.e., back plane) of each hook member 10 and 11 in confronting arrangement, the members 10 and 11 are pivoatlly pinned together, as by a rolled pin 12, at the junctures of the shanks 10b and 11b with the bases 10a and 11a. In the closed position as illustrated in FIG. 1, the toggle bases 10a and 11a of the hook members extend in opposite directions and the shank 10b and 11b and bight 10c and 11c portions form a continuous, teardrop loop. As illustrated in FIG. 5, the bight portions 10c and 11c in section form a substantially half-round interior surface to facilitate coupling engagement with a ring 13 or the like.

So constructed, typical application of the link device is sequentially illustrated in FIGS. 2 through 4. It may, for example, be desirable to install the removable link in a plate 14 having a hole 14a therethrough. The plate 14 can be of any shape or dimensions and has a front face 14b and a rear or blind surface 14c. In FIG. 2, the hook members 10 and 11 are first pivoted to an open position with the toggle bases 10a and 11a of each in alignment. The aligned toggle bases 10a and 11a are then inserted through the hole 14a and the hook members 10 and 11 are pivoted toward each other. Before the ends 10d and 11d of the hooks meet and cross, a ring 13 of a tie-down 13a such as illustrated, or a loop of rope, or a chain link may be inserted between the hook portions 10c and 11c. Upon further closing of the hook members 10 and 11, it is important that the ring 13 be received in the central region between the two ends 10d and 11d of the hook members rather than to one side in order to prevent binding of the ring 13 in the partially closed link. The appropriate position is shown in FIG. 3. The hook members 10 and 11 are then rotated to the fully closed position shown in FIG. 4 to form a continuous teardrop-shaped loop around the ring 13.

The combined thicknesses of the shank portions 10b and 11b of the two hook members is less than the diameter of the hole 14a in the plate 14, but each of the base portions 10a and 11a is greater in length than the diameter of the hole 14a. Thus, the toggle portions 10a and 11a engage the blind side 14c of the plate to distribute laterally to the plate 14 any tension force supplied through the link from the tie-down 13a.

For removal of the link, it should be noted that tension on the tie-down 13a must be slackened and the ring 13 moved toward the upper portion of the bight (i.e., toward the pivot pin 12) in order to rotate the hook members 10 and 11 out of encircling engagement with the ring 13. This feature is a significant safety advantage inasmuch as there is no danger of the connection working loose and the tie-down 13a must be intentionally slackened and the link pivoted in order to effect removal.

Likewise, the specifically described configuration of the hook members 10 and 11 offers a distinct safety advantage in the event of fracture of the pivot pin 12. Even assuming the pin 12 is totally severed at the juncture of the hook members 10 and 11, the members will remain in the closed position in supporting engagement of the ring 13 so long as slight tension is applied. Thus, likelihood of any accidental failure of the coupling is exceedingly remote.

Although operation of the link in FIGS. 2 through 4 is illustrated for use with a closed ring 13 and tie-down 13a, it should be readily apparent to those skilled in the art that the link may be readily employed with an apertured part and installed by itself to the closed position. The link would thus present a continuous loop to which may be tied a rope or to which may be secured any number of disconnectable couplings such as a clevis or the like or which may form part of a tackle through which passes a rope or the like and thereby acts to selectively redirect the tension force applied through the link.

From the foregoing it will be seen that this invention is one well adapted to attain all ends and objects hereinabove set forth, together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described my invention I claim:

1. A removable link for installation in a blind aperture of a plate, said link comprising:

a pair of like parts each being coplanar and generally in the shape of the numeral "2", each said part having an aperture penetrating base leg and a hook member integrally joined at one end of said base leg, said hook member comprising a shank portion joined to said base leg and an arcuate portion integral with said shank portion curvingly extended through at least 180° and less than 360° to terminate in a hook end directed toward said base leg, thereby defining an opening to the bight of said arcuate portion;

pin means pivotally joining said like parts in reverse confronting engagement at the junctures of said base legs with said hook members thereof such that said base legs extend in opposite directions when said hook members are pivoted to overlie each other;

whereby said like parts may be pivotally rotated to an open position wherein said base legs align for insertion in said aperture and whereby said like parts may be pivotally rotated substantially 90° from the open position to a closed position wherein said base legs extend in opposite directions from said pin means and said hook members overlie each other to form a continuous loop.

2. The link as in claim 1, the combined thicknesses of said shank portions being less than the size of said aperture.

3. The link as in claim 1, said like parts having confronting engagement surfaces, each of said surfaces being substantially flat and lying in a common plate whereby said surfaces overlyingly ride in abutting relationship during pivotal movement of said like parts.

4. The link as in claim 1, said arcuate portion of each of said like parts being substantially quarter-round in section whereby in said closed position said arcuate portions provide an interior half-round seating surface.

* * * * *

UNITED STATES PATENT AND TRADEMARK OFFICE
CERTIFICATE OF CORRECTION

PATENT NO. : 4,065,833
DATED : January 3, 1978
INVENTOR(S) : Lawrence C. Bender

It is certified that error appears in the above-identified patent and that said Letters Patent are hereby corrected as shown below:

Column 4, line 44, change "plate" to read -- plane --.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks